G. A. N. COPPEDGE.
HOLDER FOR SYRUP CUPS AND OTHER ARTICLES.
APPLICATION FILED MAR. 2, 1915.
1,234,877.
Patented July 31, 1917.
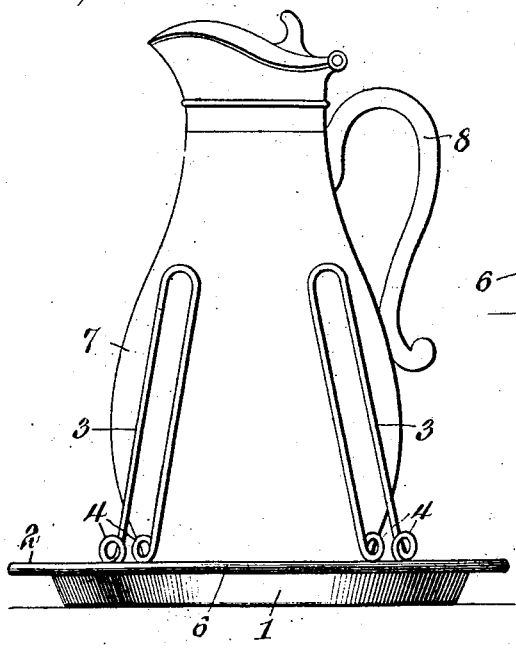
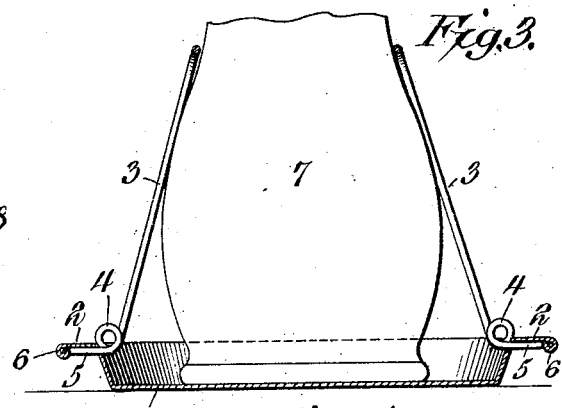
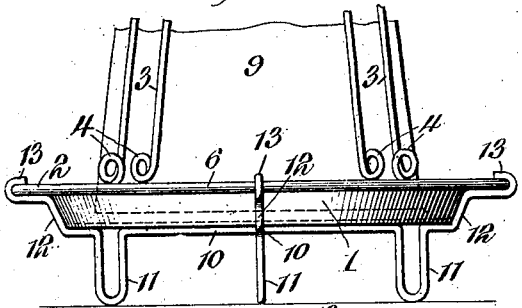
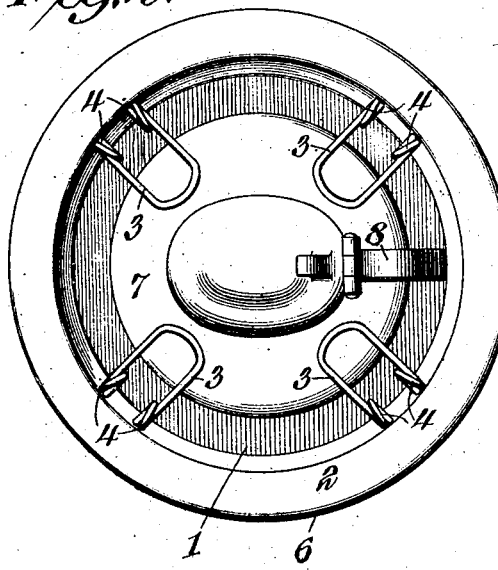
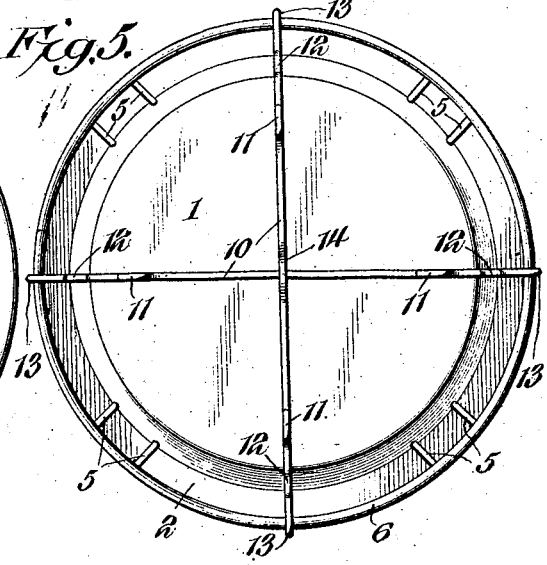
WITNESSES
G. A. N. Coppedge, INVENTOR,
BY
ATTORNEY

UNITED STATES PATENT OFFICE.

GEORGE ALVAH NICHOLSON COPPEDGE, OF WINSTON-SALEM, NORTH CAROLINA.

HOLDER FOR SYRUP-CUPS AND OTHER ARTICLES.

1,234,877.     Specification of Letters Patent.     Patented July 31, 1917.

Application filed March 2, 1915. Serial No. 11,622.

*To all whom it may concern:*

Be it known that I, GEORGE A. N. COPPEDGE, a citizen of the United States, residing at Winston-Salem, in the county of Forsyth and State of North Carolina, have invented a new and useful Holder for Syrup-Cups and other Articles, of which the following is a specification.

This invention has reference to holders for syrup cups and other articles, and its object is to provide a means whereby drip from the syrup cup or the like is prevented from reaching the table or table cloth upon which the article is placed.

In accordance with the present invention there is provided a suitable dish carrying a series of spring fingers so arranged as to tend one toward the other, whereby when a syrup cup is placed on the dish the spring fingers move into engagement with the sides of the cup and thereby retain the dish on the cup and when the cup is lifted in order to pour syrup from it, the dish retains its position with respect to the cup, so that on replacing the cup the dish is always in position to catch any drippings which may occur.

In conjunction with the dish detachable legs are provided, so that the dish may be supported at a slight height, and this is especially valuable where the dish is used for the reception of some other article than a syrup cup, and particularly such an article as a coffee or tea pot where dripping is also liable to occur and soiling of the table or table cloth is avoided. In the case of a coffee or tea pot or other articles where the contents are liable to be hot, the legs provide a support protecting the table from the effects of heat. By the present invention these legs are readily attachable and detachable, while the fingers may remain permanently attached to the dish.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—

Figure 1 is an elevation of a dish constructed in accordance with the present invention and showing its application to a syrup or molasses cup.

Fig. 2 is a plan view of the structure of Fig. 1.

Fig. 3 is a diametric section of the dish taken on a diameter including two opposite fingers, the syrup cup being shown in elevation.

Fig. 4 is an elevation of the dish with legs attached for holding a coffee or tea pot.

Fig. 5 is a bottom plan view of the structure of Fig. 4.

Referring to the drawings, there is shown a dish 1 which by preference may be a metal dish with a flat bottom so as to rest solidly upon any smooth surface, such as a table, whether or not the table be covered with a table cloth. This dish is formed with a marginal radially outstanding rim 2 and the dish may be quite shallow.

At appropriate points about the marginal portion of the dish spring fingers 3 are attached. These fingers may be each conveniently made of a piece of wire bent upon itself into an elongated narrow U-shape with the legs near their terminals coiled upon themselves into the form of spring loops 4, and each leg has a short angular extension 5 beyond the loop 4, which extension is carried through the corresponding portion of the side wall of the dish and may reach as far as the outer margin of the flange 2, which latter is shown as provided with a bead 6. The extensions 5 are secured to the under side of the flange 2 in any appropriate manner, as by soldering. The loops or turns 4 serve as elastic joints upon which the fingers 3 may be moved away from the central axis of the dish, but these fingers have a normal tendency toward such axis. The fingers 3 are long enough to engage the side walls of a receptacle 7, which in Figs. 1, 2 and 3 is shown as a syrup or molasses cup of customary form and may be taken as indicative of any suitable cup or pitcher, whether of metal, glass or other material. The dish 1 may be quite light for it may be conveniently pressed out of sheet metal and the fingers 3 may be made of wire of appropriate gage and material so as to press against the sides of the cup or pitcher 7 sufficiently to maintain the dish 1 always in proper relation to the cup.

If now it be desired to pour out the contents of the cup or pitcher, the latter is grasped in the usual way as by means of the customary handle 8, and the cup with the dish attached thereto is raised and tipped so that its contents pour therefrom through the usual spout. After the pouring is accomplished the cup is returned to the upright position and placed upon the table or other support, and any drippings which may occur flow down the outside of the cup and are ultimately caught in the dish 1. Such drippings are usually not at all excessive, and with such thick material as syrup or molasses they do not accumulate sufficiently to flow out from the tipped dish in the event of frequent use and a moderate accumulation of drippings.

Since it is customary to cleanse the dish after each meal, this is readily accomplished by simply lifting the cup from the dish while the latter is held against participation in the movements of the cup. The fingers 3 readily yield to the movement, and then the dish may be cleansed. By prying apart the fingers 3 the cup is readily replaced in the dish for subsequent use.

The same dish is useful for other articles than syrup cups, as, for instance, a coffee or tea pot 9, as indicated in Fig. 4. Such a receptacle is readily held by the fingers 3 since the shape of the coffee pot or the shape of the syrup pitcher permits the movement together of the free or outer ends of the fingers 3, so that there is a lower portion of the cup or pitcher or pot of greater diameter than the distance between the fingers where engaging the cup. These fingers at the hinge points 4 are spread apart a distance nearly as great as the diameter of the dish which is greater than the diameter of the pot or pitcher, so that there is no liability of escape of the dish when once the pot or pitcher is installed therein.

In Figs. 4 and 5 the dish is shown as supported upon legs. These legs each consist of a piece of wire 10 looped upon itself at spaced points to form legs 11 and beyond these loops, which are open loops, the wire 10 is continued as shown at 12 in conformity with the exterior shape of the dish and terminates in return portions 13 adapted to engage over the bead 6. By providing two wires 10 with legs 11 at proper spaced points, and each wire terminating at the ends in hooks 13, the two wires may be arranged at right angles in underriding relation to the dish 1, while the legs 11 permit an elongation of the wire structures sufficiently to snap the hooks 13 over the bead 6, thereby holding the legs to the bottom of the dish with one pair of legs in crossed relation to the other, whereby the dish is supported upon four legs suitably spaced apart. One of these wires 10 has an intermediate bent portion 14 so that the wire may be readily crossed over the other wire without bringing the main portion of the two wires out of the plane of the bottom of the dish 1. The legs 11 serve to elevate the dish enough to prevent harm to a table or other support when the contents of the receptacle are hot.

When it is desired to use the structure for some receptacle where the contents are cold, the legs may be readily removed and laid to one side.

What is claimed is:—

A drip catcher for syrup cups and other receptacles, comprising a shallow, flat dish with an upstanding flaring rim portion terminating in an outstanding flange, and spring fingers rising from the rim of the dish with their upper ends approaching to grasp and hold the body of a syrup cup or the like, said spring fingers being each formed of a single piece of wire bent intermediately upon itself and near the free ends formed into spring loops with the free ends beyond the loops projecting outwardly through the rim below the flange and secured to the under face of the flange outside of the rim.

In testimony, that I claim the foregoing as my own, I have hereto affixed my signature in the presence of two witnesses.

GEORGE ALVAH NICHOLSON COPPEDGE.

Witnesses:
H. F. DAVISEY,
W. A. WILKINSON.